US012337787B2

(12) United States Patent
Stegmeier et al.

(10) Patent No.: US 12,337,787 B2
(45) Date of Patent: Jun. 24, 2025

(54) VEHICLE OCCUPANT RESTRAINT SYSTEM HAVING FRONT AIRBAG AND SIDE AIRBAG

(71) Applicant: ZF AUTOMOTIVE GERMANY GMBH, Alfdorf (DE)

(72) Inventors: Michael Stegmeier, Schwäbisch Gmünd (DE); Anton Fischer, Schechingen-Leinweiler (DE); Axel Kamrath, Aschaffenburg (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 17/797,761

(22) PCT Filed: Feb. 5, 2021

(86) PCT No.: PCT/EP2021/052733
§ 371 (c)(1),
(2) Date: Aug. 5, 2022

(87) PCT Pub. No.: WO2021/156402
PCT Pub. Date: Aug. 12, 2021

(65) Prior Publication Data
US 2023/0067893 A1   Mar. 2, 2023

(30) Foreign Application Priority Data
Feb. 5, 2020 (DE) ..................... 10 2020 102 866.0

(51) Int. Cl.
*B60R 21/232* (2011.01)
*B60R 21/00* (2006.01)
(Continued)

(52) U.S. Cl.
CPC .......... *B60R 21/232* (2013.01); *B60R 21/203* (2013.01); *B60R 21/213* (2013.01);
(Continued)

(58) Field of Classification Search
CPC .... B60R 2021/0009; B60R 2021/0023; B60R 2021/0048; B60R 2021/23107; B60R 21/203; B60R 21/213; B60R 21/232
See application file for complete search history.

(56) References Cited

U.S. PATENT DOCUMENTS 3,618,979 A  * 11/1971 Gulette ................. B60R 21/231
                                                    280/743.1
6,715,790 B2 *  4/2004 Breed ................... B60R 21/213
                                                    280/730.2
(Continued)

FOREIGN PATENT DOCUMENTS

DE           19930157 A1    1/2001
DE       202004008985 U1    8/2004
(Continued)

OTHER PUBLICATIONS

PCT Search Report for corresponding PCT International Application Serial No. PCT/EP2021/052733, mailed Mar. 5, 2021, pp. 1-5.

*Primary Examiner* — Laura Freedman
(74) *Attorney, Agent, or Firm* — Tarolli, Sundheim, Covell & Tummino LLP

(57) ABSTRACT

The invention relates to a restraint system for a vehicle occupant (26) in a motor vehicle, comprising a front airbag (28), in particular a driver's airbag, and a side airbag (14), in particular a curtain airbag. In the inflated state, the side airbag (14) is arranged and shaped in such a way that, in the event of a glancing impact of the vehicle occupant (26) on the front airbag (28), the side airbag (14) provides no significant support for the front airbag (28) in the vehicle transverse direction (y) in a front open region (20), relative to the direction of travel (x) of the vehicle, of the vehicle side below the A-pillar (12).

13 Claims, 3 Drawing Sheets

(51) Int. Cl.
    *B60R 21/203*     (2006.01)
    *B60R 21/213*     (2011.01)
    *B60R 21/231*     (2011.01)

(52) U.S. Cl.
    CPC ............ *B60R 2021/0009* (2013.01); *B60R 2021/0048* (2013.01); *B60R 2021/23107* (2013.01)

(56) References Cited

U.S. PATENT DOCUMENTS

| | | | | |
|---|---|---|---|---|
| 7,475,902 | B2 * | 1/2009 | Shiga | B62D 1/10 74/552 |
| 7,708,305 | B2 * | 5/2010 | Ishiguro | B60R 21/2338 280/743.2 |
| 7,784,823 | B2 * | 8/2010 | Heigl | B60R 21/213 280/730.2 |
| 8,282,124 | B2 * | 10/2012 | Trovato | B60R 21/232 280/730.2 |
| 8,608,199 | B2 * | 12/2013 | Fischer | B60R 21/231 280/743.1 |
| 8,764,053 | B1 * | 7/2014 | Dix | B60R 21/203 280/730.2 |
| 8,967,660 | B2 * | 3/2015 | Taguchi | B60R 21/232 280/730.2 |
| 8,998,250 | B2 * | 4/2015 | Kruse | B60R 21/232 280/730.2 |
| 9,180,834 | B1 * | 11/2015 | Le | B60R 21/203 |
| 9,469,269 | B2 * | 10/2016 | Hiruta | B60R 21/231 |
| 9,527,469 | B2 * | 12/2016 | Fukawatase | B60R 21/231 |
| 9,776,593 | B2 * | 10/2017 | Je | B60R 21/2338 |
| 9,862,347 | B2 * | 1/2018 | Deng | B60R 21/205 |
| 10,023,148 | B2 * | 7/2018 | Choi | B60R 21/23138 |
| 10,131,311 | B2 * | 11/2018 | Ohno | B60R 21/231 |
| 10,131,314 | B2 * | 11/2018 | Yoo | B60R 21/23138 |
| 10,266,144 | B2 * | 4/2019 | Slaats | B60R 21/232 |
| 10,501,044 | B2 * | 12/2019 | Moon | B60R 21/214 |
| 10,507,785 | B2 * | 12/2019 | Ishiguro | B60R 21/2338 |
| 10,668,888 | B2 * | 6/2020 | Moon | B60R 21/233 |
| 10,829,081 | B2 * | 11/2020 | Nakajima | B60R 21/239 |
| 10,870,407 | B2 * | 12/2020 | Jung | B60R 21/232 |
| 10,967,829 | B1 * | 4/2021 | Mills | B60R 21/203 |
| 11,358,560 | B2 * | 6/2022 | Kamiyama | B60R 21/233 |
| 11,453,357 | B2 * | 9/2022 | Morita | B60R 21/26 |
| 11,623,596 | B2 * | 4/2023 | Honma | B60R 21/2338 280/731 |
| 2005/0269806 | A1 * | 12/2005 | Huber | B60R 21/232 280/730.2 |
| 2014/0203541 | A1 * | 7/2014 | Wei | B60R 21/213 280/730.2 |
| 2015/0130171 | A1 | 5/2015 | Abramoski et al. | |
| 2016/0200281 | A1 * | 7/2016 | Takeshita | B62D 1/11 280/730.2 |
| 2017/0072896 | A1 | 3/2017 | Fukawatase et al. | |
| 2022/0144201 | A1 * | 5/2022 | Morita | B60R 21/239 |

FOREIGN PATENT DOCUMENTS

| | | | |
|---|---|---|---|
| DE | 102010002573 A1 | | 11/2010 |
| DE | 102015107350 A1 | | 12/2015 |
| DE | 102016000206 A1 | | 7/2016 |
| JP | H0328048 A | | 2/1991 |
| JP | 2013141886 A | | 7/2013 |
| JP | 2015110368 A | * | 6/2015 |
| JP | 2018075962 A | * | 5/2018 |
| JP | 2018114838 A | * | 7/2018 |
| JP | 2019112043 A | * | 7/2019    B60R 21/203 |
| WO | 1993/16902 A1 | | 9/1993 |

* cited by examiner

VEHICLE OCCUPANT RESTRAINT SYSTEM HAVING FRONT AIRBAG AND SIDE AIRBAG

RELATED APPLICATIONS

This application is a U.S. National Stage Application filed under 35 USC 371, claiming priority to Serial No. PCT/EP2021/052733, filed on 5 Feb. 2021; which claims priority from German Patent Application DE 10 2020 102 866.0, filed 5 Feb. 2020, the entireties of which are hereby incorporated herein by reference.

TECHNICAL FIELD

The invention relates to a vehicle occupant restraint system for a motor vehicle, having a front airbag, in particular a driver's airbag, and a side airbag, in particular a curtain airbag.

BACKGROUND

Vehicle occupant restraint systems having inflatable airbags which unfold from the vehicle trim or from the steering wheel are known and serve to restrain a vehicle occupant in a restraining case, in particular in the event of an accident, such that their body parts do not strike hard components of the vehicle, for instance the side structure, the side windows, the steering wheel or the windshield.

Usually, front airbags and side airbags are provided in a vehicle for the front vehicle occupants, i.e. the driver and the front passenger(s), these airbags providing protection in the event of a frontal impact and a side impact, respectively. But also in the event of a glancing impact, which includes a laterally offset frontal impact or a side impact offset in the vehicle longitudinal direction, a sufficient protective action should be provided for the vehicle occupants, in particular with regard to possible angular accelerations and angular speeds of a vehicle occupant's head.

The object of the invention is to create a vehicle occupant restraint system which, in particular in the event of a glancing impact, ensures good restraining protection for a vehicle occupant without the vehicle occupant's head being exposed to excessive strain.

SUMMARY

This object is achieved by a restraint system having the features of claim 1. Advantageous and expedient configurations of the restraint system according to the invention are specified in the dependent claims.

The restraint system according to the invention for a vehicle occupant in a motor vehicle comprises a front airbag, in particular a driver's airbag, and a side airbag, in particular a curtain airbag. According to the invention, the side airbag is arranged and shaped in the inflated state such that, in the event of a glancing impact of the vehicle occupant with the front airbag, the side airbag does not provide significant support for the front airbag in the vehicle transverse direction in a front free area, with respect to the direction of travel of the vehicle, of the vehicle side below the A-pillar.

The invention is based on the finding that, in the event of a glancing impact, a deliberately omitted support of the front airbag by the side airbag can result in a better protective action for the vehicle occupant. This finding is surprising since previously, in the development of vehicle occupant restraint systems with mutually coordinated front and side airbags, as good support as possible of the front airbag by the side airbag was desired in order to keep the front airbag in a stable position in the event of a glancing impact.

Contrary to this trend, in the vehicle occupant restraint system according to the invention, the airbags are coordinated with one another such that, in the event of a glancing impact, there is actually no significant lateral support of the front airbag by the side airbag. This is because it has been found that it is advantageous if, when the vehicle occupant's head makes glancing contact with the front airbag, this follows the movement of the head—to a limited extent. This deliberately allowed oblique movement of the front airbag is achieved according to the invention by the free area provided in the front region of the passenger compartment below the A-pillar, the front airbag being able to pass into said free area without being significantly impeded by the side airbag.

This coordination of the two airbags with one another has the result that the vehicle occupant's head is turned only to the extent to which the front airbag moves into the free area. By comparison, if the vehicle occupant's head makes glancing contact with a hard front airbag retained in its unfolded position, there is the risk of the head striking the contact wall of the front airbag, sliding along the latter or being retained thereby and as a result being exposed to significant angular accelerations and/or angular speeds, which should be avoided in order to lower the risk of head, brain and neck injuries.

The position of the free area, i.e. of that vehicle side region in the passenger compartment into which the front airbag is intended to pass without being "resisted" by the side airbag, has to be coordinated with the direction of movement of the front airbag. In the event of a glancing impact, it is accordingly expedient for the free area to be located, with regard to the direction of travel, at least mostly at the level of and/or in front of the inflated front airbag on the vehicle side. This positional indication of the free area relates to the original position of the fully unfolded front airbag before the vehicle occupant makes contact therewith. This means that the vehicle occupant making glancing contact with the front airbag can push the front airbag obliquely forward into the free area provided there. As long as the vehicle has an energy-absorbing steering column, it is possible, when designing and setting the position of the free area, to also take into consideration the possible displacement of the front airbag in the vehicle longitudinal direction, which is caused by the energy-absorbing steering column.

The free area itself can be realized in principle in various ways. The simplest possibility is for the front end of the side airbag not to project into the free area at all, such that the free area is not covered by the side airbag at all. The side airbag can, however, also be shaped in particular such that it leaves only a part of the free area free.

If the side airbag has a portion that unfolds into the free area, i.e. is positioned within the free area in the inflated state, this portion should be thinned in the vehicle transverse direction, in order that enough free space remains for the entry of the front airbag. In this case, the thinned portion of the side airbag is preferably coordinated in terms of its design with the front airbag such that, in the original position of the fully unfolded side airbag and of the fully unfolded front airbag before the vehicle occupant makes contact therewith, virtually no contact is brought about between the side airbag and the front airbag.

Such a thinned portion of the side airbag can, in the simplest case, have only one or more fabric layers, between which no gas-filled chambers are formed.

However, the thinned portion of the side airbag can easily also have gas-filled chambers, as long as these are much thinner in the vehicle transverse direction than chambers of adjacent portions of the side airbag.

In general, the thinned portion of the side airbag should have a thickness in the vehicle transverse direction that is less than half, preferably less than a third of, of the thickness of a portion of the side airbag that adjoins counter to the direction of travel.

According to the preferred application of the invention, the front airbag of the vehicle occupant restraint system is a driver's airbag that unfolds from the steering wheel of the vehicle, wherein the steering wheel forms a tilting device for the front airbag in the event of a glancing impact. It has been found that, in the event of a glancing impact, a tilting movement of the front airbag into the free area is particularly advantageous for avoiding an angular acceleration and/or angular speeds of the vehicle occupant's head. The rim of the steering wheel, from which the front airbag has unfolded, serves simply as the edge via which the front airbag is tilted. Therefore, no additional device needs to be provided in order to achieved the desired movement of the front airbag.

Most suitable for the vehicle occupant restraint system according to the invention is a three-dimensional front airbag, which has preferably a contact wall facing the vehicle occupant, an opposite rear wall and a lateral portion arranged between the two walls. A front airbag designed in this way has, in the unfolded state, a sufficient thickness, which, compared with a two-dimensional airbag, allows filling with a relatively low pressure. The softer three-dimensional airbag favors penetration of the head into the airbag without forcing it to rotate on account of contact with the contact wall.

In an alternative embodiment, the front airbag can have a contact wall facing the vehicle occupant and a rear wall. Preferably, the rear wall is configured such that the rear wall has the shape of a truncated cone in the unfolded and filled state of the front airbag, such that the tilting or the lateral movement of the front airbag via the steering wheel rim is allowed in the event of a glancing impact. The contact wall can be both flat and curved.

In a further alternative embodiment, the front airbag can be in the form of a two-dimensional front airbag with a contact wall facing the vehicle occupant and an opposite rear wall, wherein, in the region of the rear wall and/or at the rear wall, darts, incisions and/or rebound straps have been introduced and/or fitted, such that in the unfolded and filled state of the front airbag a lateral movement or tilting of the front airbag via the steering wheel rim is allowed.

Alternatively or in combination with the embodiments of the front airbag that are set out above, the front airbag cover or the front airbag housing can be configured such that the exit opening of the front airbag is shifted in the direction of the steering wheel rim. As a result, reduced support of the rear wall on the steering wheel rim can be achieved, with the result that tilting of the front airbag via the steering wheel rim is allowed, or the possibility thereof is improved.

BRIEF DESCRIPTION OF THE DRAWINGS

Further features and advantages of the invention will become apparent from the following description and from the accompanying drawings, to which reference is made. In the drawings.

DESCRIPTION

Figure 1:
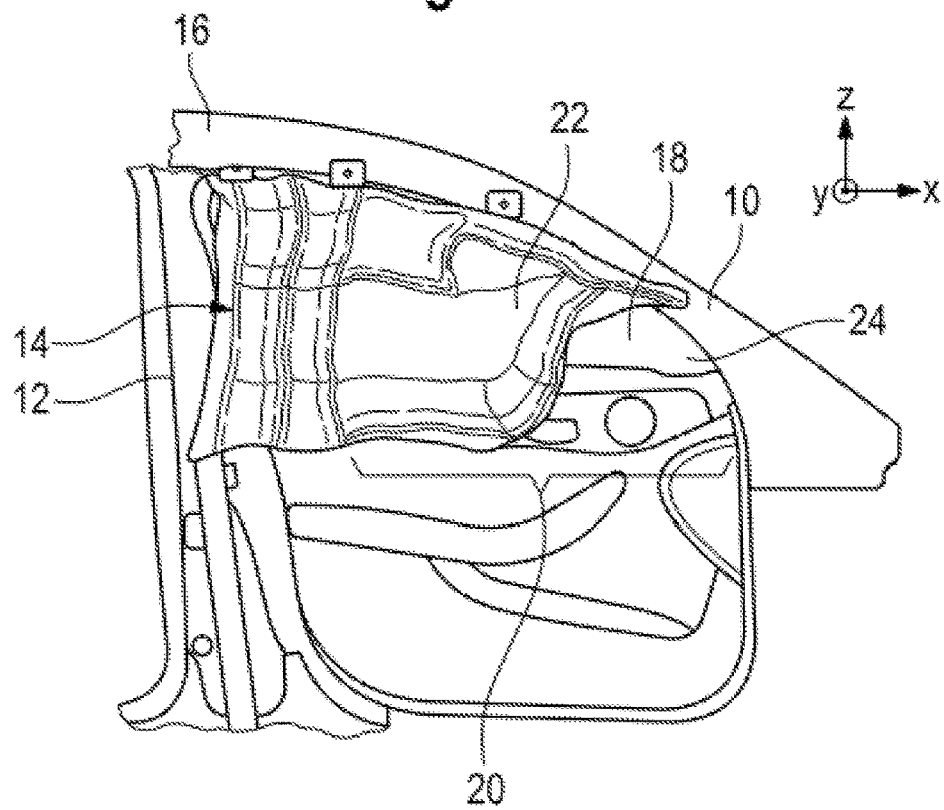
FIG. 1 shows a side view of a vehicle interior with a side airbag of a vehicle occupant restraint system according to the invention according to a first embodiment.

FIG. 1 illustrates a driver's side interior of a motor vehicle, which contains the A-pillar 10, the B-pillar 12 and substantially the region of the driver's door. Furthermore, a fully inflated side airbag 14 of a vehicle occupant restraint system is shown, more specifically a curtain airbag, which has unfolded downwardly from the roof frame 16 and the A-pillar 10 and covers a substantial part of the side window 18 of the driver's door. In the illustrated exemplary embodiment, the side airbag 14 extends toward the rear (counter to the direction of travel x) in the vehicle longitudinal direction as far as the B-pillar 12. The side airbag 14 can, however, also extend over a greater area of the vehicle side and in particular also cover the rear side windows of the vehicle.

As indicated in FIG. 1, the inflated side airbag 14 extends, with its front end with regard to the direction of travel x, into an area of the vehicle side that is referred to below as the free area 20. In this free area 20, the side airbag 14 does not, in the event of a glancing impact, provide any significant support in the vehicle transverse direction y for a front airbag of the vehicle occupant restraint system. This desired functionality is explained in more detail below.

In the free area 20, a front side airbag portion 22 is positioned, which, compared with the portion of the side airbag 14 that adjoins counter to the direction of travel x, has a much reduced thickness in the vehicle transverse direction y. This portion 22 has either no gas-filled chambers at all or only thinner chambers.

Moreover, the side airbag 14 leaves, below the A-pillar 10, a front subregion 24, with respect to the direction of travel x, of the vehicle side completely free, i.e. this recessed subregion 24 is not covered by the side airbag 14.

Figure 2:
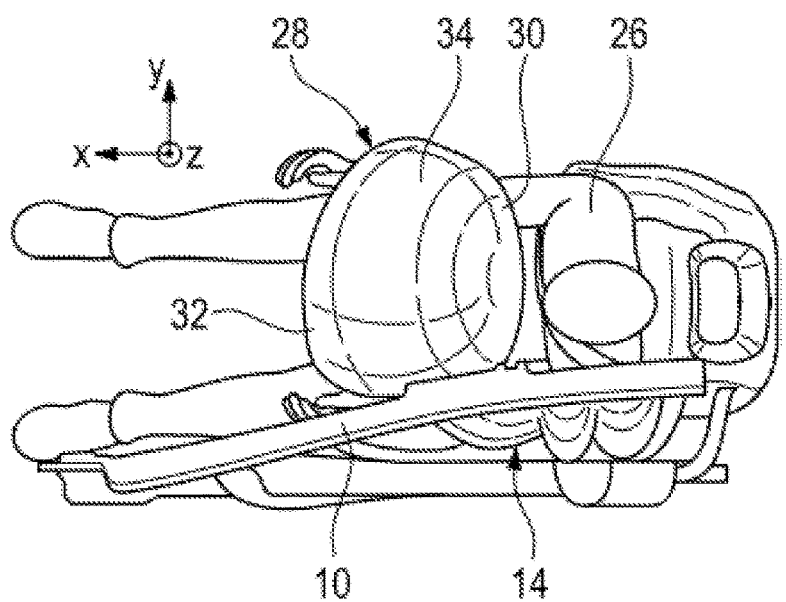
FIG. 2 shows a plan view of a vehicle occupant and a front airbag and a side airbag of a vehicle occupant restraint system according to the invention according to the first embodiment.

FIG. 2 shows a plan view of a vehicle occupant 26, more specifically the driver of the vehicle, and a fully inflated front airbag 28, more specifically a driver's airbag, which has unfolded from the steering wheel, and the fully inflated side airbag 14 from FIG. 1. The front airbag 28 is what is known as a three-dimensional airbag, which not only consists substantially of two fabric parts that are connected together one on top of the other and peripherally, but is also formed from a plurality of fabric parts and, in addition to a contact wall 30 facing the vehicle occupant 26 and an opposite rear wall 32, also has a lateral portion 34 connecting the two walls 30, 32. In the inflated state, the front airbag 28 has relatively low tensile stress in the region of its rear wall 32.

Both airbags 14, 28 belong to the same vehicle occupant restraint system for protecting the same vehicle occupant 26, in this case the driver. FIG. 2 illustrates a situation in which the airbags 14, 28 are already fully inflated but the vehicle occupant 26 has not yet passed into one of the airbags 14, 28.

As already mentioned, the side airbag 14 and the front airbag 28 are coordinated with one another such that, in the event of a glancing impact, in which both the side airbag 14 and the front airbag 28 are activated and inflated, the side airbag 14 does not provide any significant support in the vehicle transverse direction y for the front airbag 28. In particular, the side airbag portion 22 is preferably coordinated, in terms of its configuration, with the front airbag 28 such that, in the original position of the fully unfolded side airbag 14 and of the fully unfolded front airbag 28, before the vehicle occupant 26 makes contact therewith, virtually no contact is brought about or exists between the side airbag 14 and the front airbag 28.

This is because if the head of the vehicle occupant 26 makes glancing contact with the front airbag 28, the latter moves obliquely forward into the free area 20, and so the front airbag 28 follows the movement of the head of the vehicle occupant 26. As a result, excessive angular acceleration of the head of the vehicle occupant 26 is avoided.

This behavior is favored in the event of a glancing impact by the shape and the internal pressure of the front airbag 28, which are designed such that, at least initially, the head of the vehicle occupant 26 can pass relatively unimpeded into the front airbag 28, i.e. the head does not strike the contact wall 30, nor does it slide along the contact wall 30 and is set into rotation on account of the friction.

The desired movement of the front airbag 28 in the direction of the free area 20 is supported, in the case of a driver's airbag, by the steering wheel, from which the front airbag 28 has unfolded. More specifically, the steering wheel rim serves as an edge via which the front airbag 28 is tilted toward the free area 20.

Figure 3:
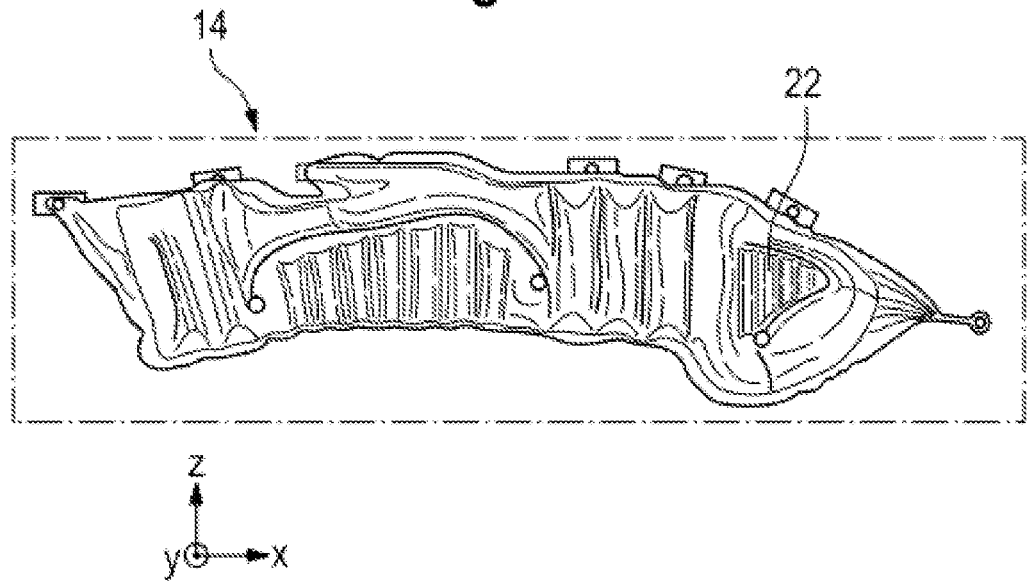
FIG. 3 shows a side view of a side airbag of a vehicle occupant restraint system according to the invention according to a second embodiment.

FIG. 3 shows another embodiment of the side airbag 14 for the vehicle occupant restraint system. The side airbag 14, illustrated in the fully inflated state, is a curtain airbag, which is intended to fully cover all the side windows of a vehicle side.

The side airbag 14 is subdivided into a large number of separated chambers. At its front end in the vehicle direction x, the side airbag 14 has a portion 22 which, compared with adjoining portions of the side airbag 14, in particular compared with the portion that adjoins counter to the direction of travel x, has a much reduced thickness in the vehicle transverse direction y. In this portion 22, although individual chambers are likewise formed, these are much thinner than the chambers of the surrounding portions.

The portion 22 is arranged within the side airbag 14 such that it is positioned in the free area 20 after the side airbag 14 has unfolded in the vehicle. This means that, in the event of a glancing impact, the associated front airbag 28 of the vehicle occupant restraint system is moved or tilted in the direction of the portion 22 when the vehicle occupant 26 comes into contact with the front airbag 28. The front airbag 28 moved or tilted into the free area 20 is not significantly supported by the side airbag 14 there.

Figure 4:
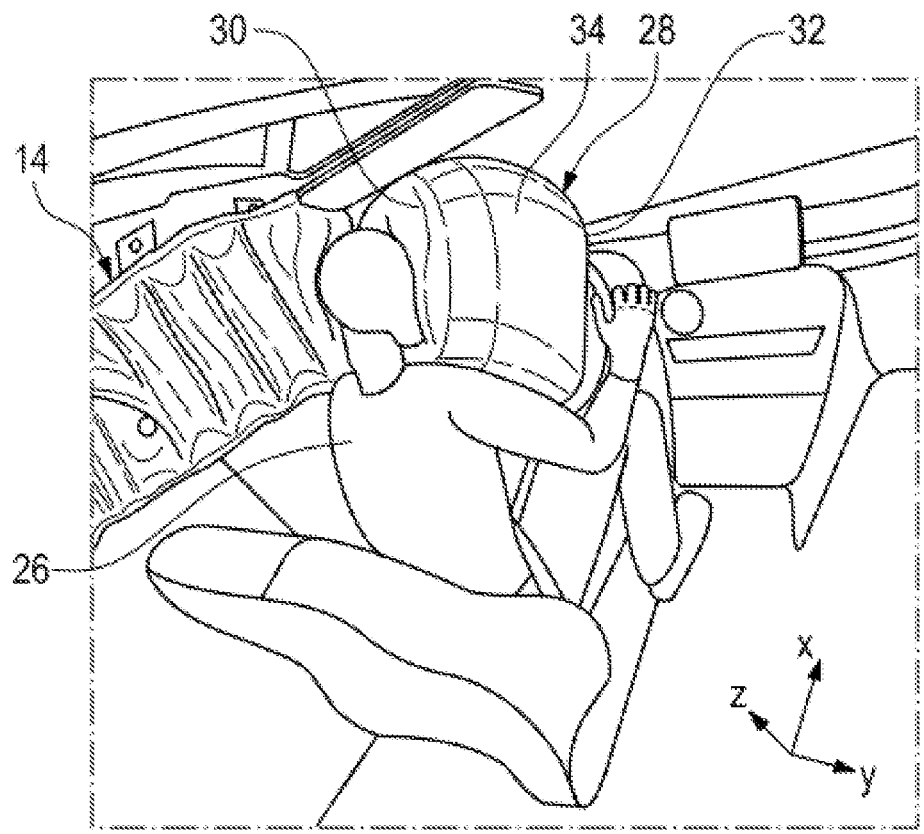
FIG. 4 shows a perspective view of a vehicle interior with a vehicle occupant and a front airbag and a side airbag of a vehicle occupant restraint system according to the invention according to the second embodiment, and FIGS. 5 $a$) to $d$) show different plan view of front airbags of a vehicle occupant restraint system according to the invention according to further embodiments.

FIG. 4 clearly illustrates such a glancing impact scenario, in which both the side airbag 14 and the front airbag 28 were inflated. As a result of the vehicle occupant 26 passing into the front airbag 28, the latter has been tilted obliquely forward via the steering wheel rim into the free area 20, where the relatively thin portion 22 of the side airbag 14 is positioned (the free area 20 and the side airbag portion 22 are concealed in FIG. 4). Therefore, the front airbag 28 is virtually not supported by the side airbag 14 in the vehicle transverse direction y. As can be seen in FIG. 4, the head of the vehicle occupant 26 is, however, retained by a rear, thicker portion of the side airbag 14 in order that it does not swing too far to the side.

Figure 5:
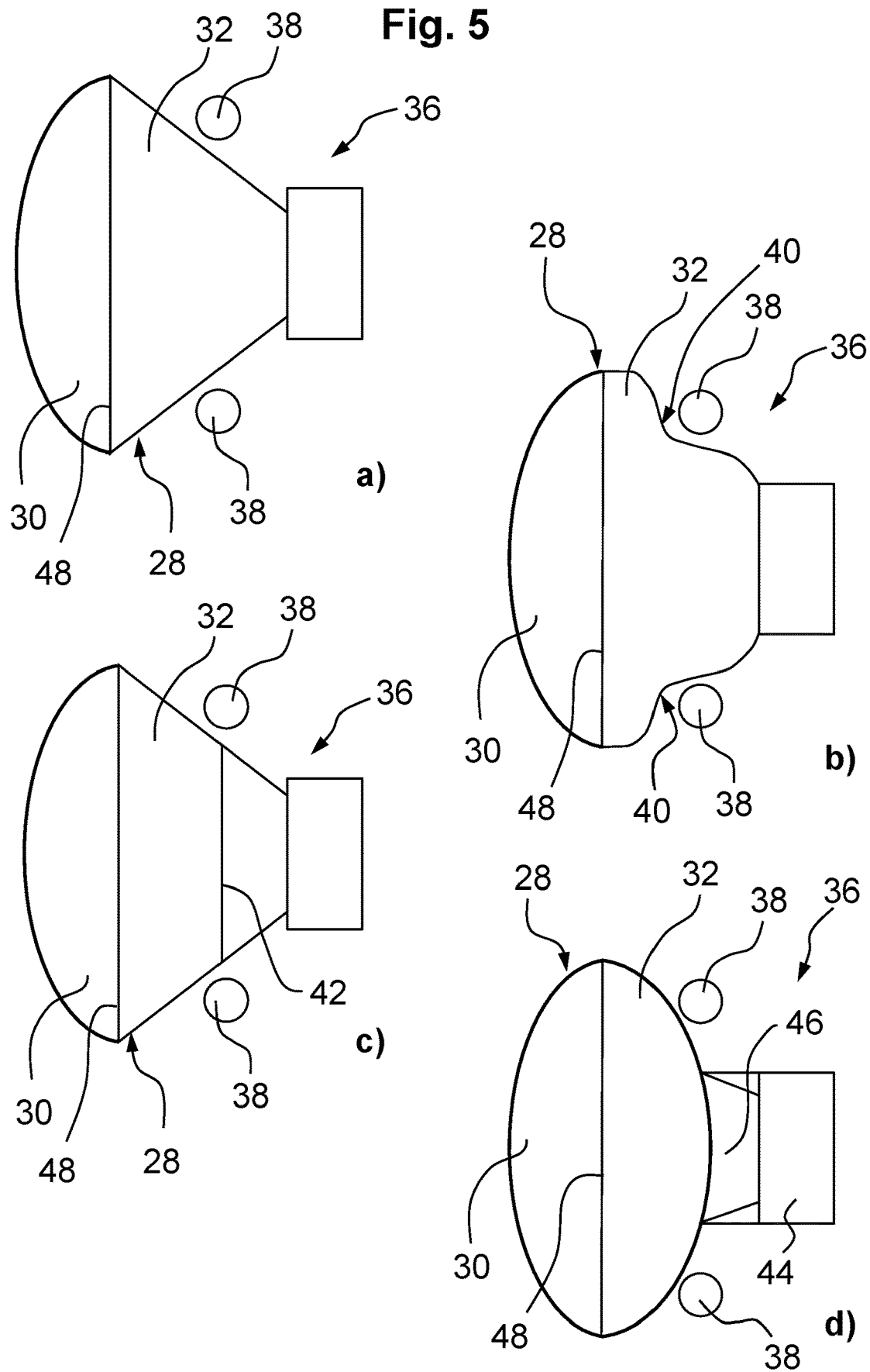

FIGS. 5 a) to 5 d) illustrate different alternative embodiments of the front airbag 28, which allow tilting and a lateral movement of the front airbag 28 via the steering wheel rim 38 of the steering wheel 36. The front airbags 28 in FIGS. 5 a) to d) in this case each have a contact wall 30 facing the vehicle occupant 26 and an opposite rear wall 32, which are connected peripherally together, for example by a seam 48.

FIG. 5 a) shows an embodiment of the front airbag 28 in which the rear wall 32 is configured such that the rear wall 32 has the shape of a truncated cone in the unfolded and filled state of the front airbag 28. As a result, the tilting and the lateral movement of the front airbag 28 via the steering wheel rim 38 is allowed in the event of a glancing impact.

FIG. 5 b) shows an embodiment of the front airbag 28 in which darts 40 have been introduced into the rear wall 32 of a two-dimensional front airbag 28 such that the shape of the rear wall 32 is influenced such that, in the unfolded and filled state of the front airbag 28, a lateral movement and tilting of the front airbag 28 via the steering wheel rim 38 is allowed.

FIG. 5 c) shows an embodiment of the front airbag 28 in which, in the region of the rear wall 32, in the interior of the two-dimensional front airbag 28, a rebound strap 42 has been introduced such that the shape of the rear wall 32 is influenced such that, in the unfolded and filled state of the front airbag 28, a lateral movement and tilting of the front airbag 28 via the steering wheel rim 38 is allowed. In order to achieve this advantageous, for example substantially frustoconical, shape of the rear wall 32, it is also possible, of course, for a plurality of rebound straps 42 to be introduced in the interior of the front airbag 28 in the region of the rear wall 32.

Furthermore, it is also possible for a combination of darts 40 and/or rebound straps 42 and/or incisions to be introduced into the rear wall 32 in order to allow a lateral movement and tilting of the front airbag 28 via the steering wheel rim 38.

FIG. 5 d) shows an embodiment in which the front airbag 28 is in the form of a standardized two-dimensional front airbag 28. Tilting of the front airbag 28 via the steering wheel rim 38 is allowed here in that the front airbag housing 44 is designed such that the exit opening 46 of the front airbag 28 has been shifted in the direction of the steering wheel rim 38, with the result that reduced support of the rear wall 32 on the steering wheel rim 38 can be achieved. Of course, such shifting of the exit opening 46 toward the steering wheel rim 38 can also be applied in the embodiments of the front airbag 28 that are described above in FIGS. 2, 4 and 5a) to 5c), in order for example to further improve the possibility for tilting of the front airbag 28 via the steering wheel rim 38 in the event of a glancing impact.

LIST OF REFERENCE SIGNS

10 A-pillar
12 B-pillar
14 Side airbag
16 Roof frame
18 Side window
20 Free area
22 Portion
24 Subregion
26 Vehicle occupant
28 Front airbag 30 Contact wall
32 Rear wall
34 Lateral portion
36 Steering wheel
38 Steering wheel rim
40 Dart
42 Rebound strap
44 Front airbag housing
46 Exit opening
48 Seam

The invention claimed is:

1. A restraint system for a vehicle occupant in a motor vehicle, the restraint system comprising:
 a driver front airbag mounted on a steering wheel of the vehicle and configured to inflate between the steering wheel and the vehicle occupant, and
 a curtain airbag configured to inflate from a roof frame member to an inflated state in which the curtain airbag is positioned between a vehicle door and the occupant, the curtain airbag being configured to cover a window opening and a portion of the door below the window opening, and to extend from a B-pillar of the vehicle to an A-pillar of the vehicle and at least partially along the A-pillar,
 wherein the driver front airbag is configured to tilt relative to the steering wheel and move obliquely forward and laterally into a free area on the door in response to an angular impact of a head of the occupant with the driver front airbag, the free area extending from adjacent the driver front airbag forward of a steering wheel rim of the steering wheel,
 wherein the curtain airbag comprises a portion configured to provide minimal interaction with the driver front airbag in order to allow the driver front airbag to tilt relative to the steering wheel and move obliquely into the free area without restraint.

2. The restraint system recited in claim 1, wherein the portion of the curtain airbag is configured to extend from adjacent the steering wheel, forward of the steering wheel toward the A-pillar and upward toward the A-pillar and roof frame member.

3. The restraint system as claimed in claim 1, wherein the portion of the curtain airbag is configured to leave uncovered the free area on the door.

4. The restraint system recited in claim 1, wherein the portion of the curtain airbag has a configuration that is thinned with respect to inflatable portions of the curtain airbag configured to be positioned laterally of the vehicle occupant.

5. The restraint system as claimed in claim 4, wherein the thinned portion of the curtain airbag is free from gas-filled chambers.

6. The restraint system as claimed in claim 4, wherein the thinned portion of the curtain airbag comprises gas-filled chambers.

7. The restraint system as claimed in claim 4, wherein the thinned portion of the curtain airbag has a thickness that is less than half a thickness of the inflatable portions of the curtain airbag configured to be positioned laterally of the vehicle occupant.

8. The restraint system as claimed in claim 4, wherein the thinned portion of the curtain airbag has a thickness that is less than a third of a thickness of the inflatable portions of the curtain airbag configured to be positioned laterally of the vehicle occupant.

9. The restraint system as claimed in claim 1, wherein the steering wheel is configured permit the driver front airbag to tilt.

10. The restraint system as claimed in claim 1, wherein the driver front airbag comprises a contact wall configured to face the vehicle occupant, an opposite rear wall and a lateral portion extending between the contact wall and the rear wall.

11. The restraint system as claimed in claim 1, wherein the driver front airbag has a contact wall configured to face the vehicle occupant and an opposite rear wall, wherein the rear wall is configured to be frustoconical so as to permit the driver front airbag to tilt relative to the steering wheel.

12. The restraint system as claimed in claim 1, wherein the driver front airbag comprises a contact wall configured to face the vehicle occupant and an opposite rear wall, wherein the driver front airbag further comprises at least one of darts, incisions, and rebound straps configured to allow a lateral movement of the driver front airbag.

13. A restraint system for a vehicle occupant in a motor vehicle, the restraint system comprising:
 a driver front airbag mounted on a steering wheel of the vehicle and configured to inflate between the steering wheel and the vehicle occupant, and
 a curtain airbag configured to inflate from a roof frame member to an inflated state in which the curtain airbag is positioned between a vehicle door and the occupant, the curtain airbag being configured to cover a window opening and a portion of the door below the window opening, and to extend from a B-pillar of the vehicle to an A-pillar of the vehicle and at least partially along the A-pillar,
 wherein the driver front airbag is configured to move obliquely forward and laterally toward the door in response to an angular impact of the occupant with the driver front airbag;
 wherein the curtain airbag comprises a portion configured to leave uncovered an area on the door that receives the driver front airbag when the driver front airbag moves obliquely forward and laterally in response to the angular impact of the occupant so that the curtain airbag interacts minimally with the obliquely moving driver front airbag.

* * * * *